Patented June 7, 1927.

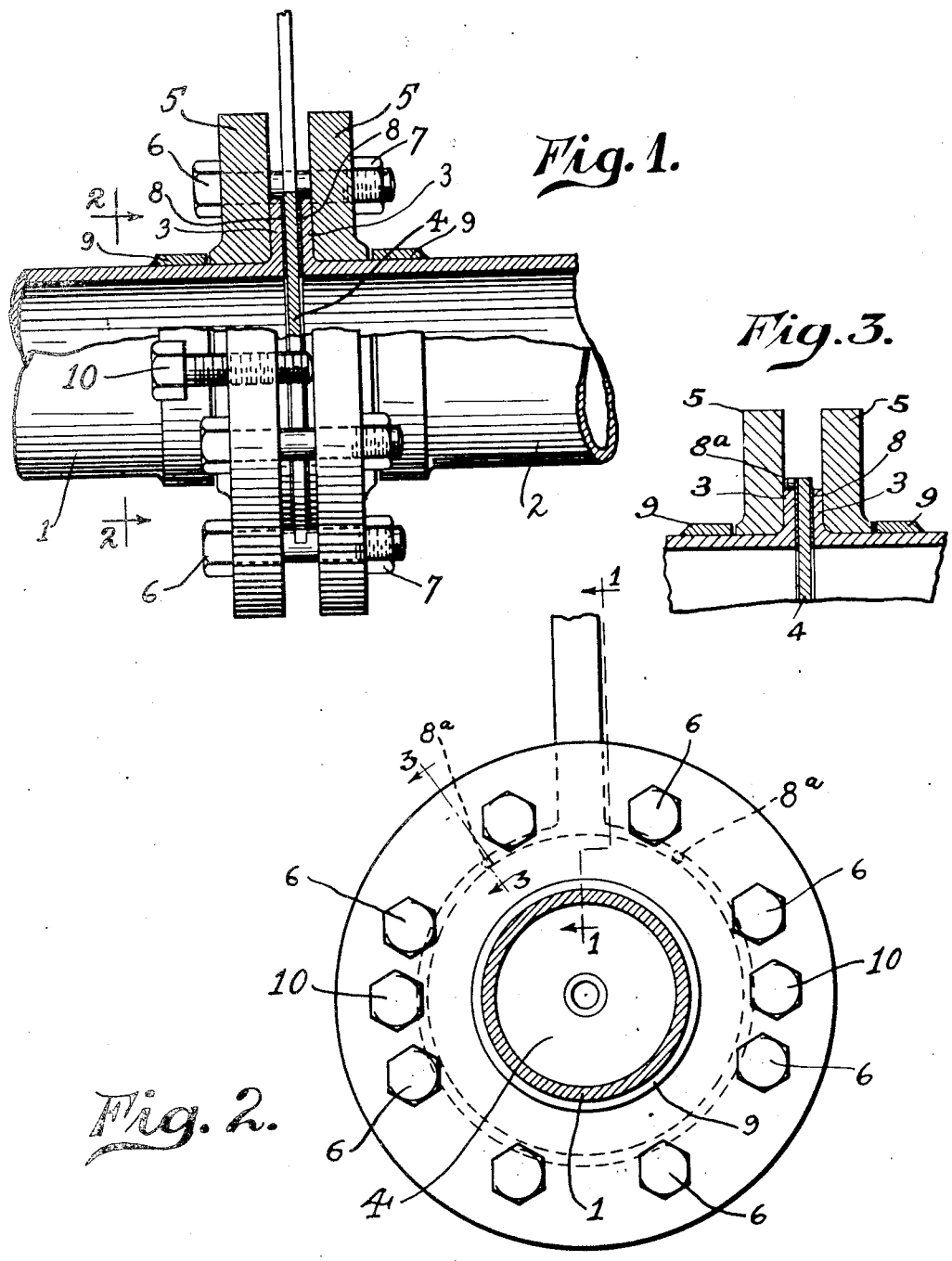

1,631,264

UNITED STATES PATENT OFFICE.

HARRY M. HALDEMAN, OF LOS ANGELES, CALIFORNIA.

ORIFICE-METER CONNECTION.

Application filed April 24, 1926. Serial No. 104,265.

This invention relates to orifice meter connections. These connections are placed in pipe lines carrying any fluid or liquid, the flow of which is to be measured. It is the custom to secure an orifice meter plate in the pipe line, which plate has an opening through it accurately formed to a standard size; there is a by-pass provided around the connection in which a meter is placed for indicating the flow. By reason of the fact that there is frequently a considerable difference in pressure on the two sides of the plate, the flow through the orifice has a high velocity, and abrasion or wire-drawing of the orifice often occurs. Hence, it is necessary to remove these orifice meter plates from time to time and substitute a new plate with an accurately cut orifice. It has been the custom to clamp the orifice meter plate between flanges on the ends of two abutting pipe sections and these flanges have usually been threaded onto the ends of the pipe sections.

In order to effect the removal of the orifice plate, it is necessary to provide means for backing the flanges away from each other to remove the pressure on the plate preparatory to its removal. When this is done it frequently strains the thread connection between the flanges and the pipe sections, and leaky joints may result from this. It has been attempted to obviate the necessity for threading the flanges on the ends of the pipe sections by forming integral collars on the ends of the pipe sections, back of which flanges are placed carrying bolts which enable the collars to be pressed against the orifice plate placed between them. This latter construction produces a serviceable non-leaking joint but it does not provide for effecting the separation of the collars to facilitate the replacement of the orifice plate.

The general object of this invention is to provide an orifice meter connection of this type which will avoid the necessity for a thread connection between the flanges and the pipe sections and which enables the integral collars to be used on the abutting ends of the pipe sections, and at the same time to provide simple means for enabling the joint to be opened up to facilitate the replacement of the orifice plate.

Further objects of the invention will appear hereinafter.

The invention consists in the novel parts and combination of parts to be described hereinafter, all of which contribute to produce an efficient orifice-meter connection.

A preferred embodiment of the invention is described in the following specification, while the broad scope of the invention is pointed out in the appended claims.

In the drawing:

Figure 1 is a view illustrating an orifice meter connection embodying my invention, the upper portion of the view showing the connection in longitudinal section and the lower portion showing the joint in side elevation. The section in this view is taken about on the line 1—1 of Fig. 2.

Figure 2 is a vertical cross section taken on the line 2—2 of Fig. 1.

Figure 3 is a section taken on the line 3—3 of Fig. 2, and passing through one of the walls of the connection at the edge of the meter plate, certain parts being broken away; this view particularly illustrates how the meter plate is held centered in the connection.

In the drawing, 1 and 2 indicate two opposed or abutting pipe lengths or sections having integral collars or laps 3 at their adjacent ends, between which the orifice meter plate 4 is held. In applying my invention, I provide a flange 5 corresponding to each pipe section and these flanges 5 are preferably loose on the pipe. Any suitable means is provided for drawing these flanges 5 together so as to clamp the laps or collars 3 against the sides of the orifice plate to produce a tight connection. For this purpose I may use ordinary bolts 6 and nuts 7. If desired, on each side of the orifice plate 4, a gasket 8 of relatively soft material may be provided.

In order to insure centering of the orifice plate 4, I may provide two centering dowel pins 8ª. These dowel pins are welded to the plate 4 at its edges and rest upon the edge of one of the collars 3 (see Fig. 3). When it is necessary to replace the orifice plate 4, the bolts 6 should be loosened and removed. In order to enable the laps or collars 3 to be forced apart, I provide means for forcing the flanges 5 apart and the thrust of this separating movement is imparted to the pipe sections 1 and 2. In order to accomplish this I provide thrust shoulders or back-up rings 9 formed or secured on the pipe sections back of each flange 5. I prefer to produce these shoulders by welding a ring around each pipe section at this point, leaving space enough between the rings and the laps 3 to permit free rotation of the flanges 5. In addition to this I provide means for exerting a separating thrust between the flanges. For example, I may provide two or more diametrically opposite set screws 10. These set screws may be threaded in one of the flanges and have their ends abutting against the opposite flange (see Fig. 1).

An orifice meter connection having these features of construction can readily be opened up to permit the replacement of the orifice plate. In opening the joint, the separating thrust of course is imparted from the flanges to the back-up rings 9 and when they are moved back they occasion the backing up of the pipe section so as to widen the space between the laps 3.

What I claim is:—

1. In an orifice-meter connection, the combination of two opposed pipe sections having integral collars at their adjacent ends, a pipe flange corresponding to each collar and mounted loosely on its corresponding pipe section, an orifice-meter plate between the collars and having an opening through it, connecting means for drawing the flanges together to clamp the meter plate between the collars, a shoulder ring corresponding to each pipe connection and disposed adjacent to its corresponding flange, and means associated with the flanges for forcing the same apart when the said connecting means for the flanges have been removed, said rings operating to take the thrust of the flanges in the separating movement to effect the separation of the collars and permit the removal of the meter plate.

2. In an orifice-meter connection, the combination of two opposed pipe sections having integral collars at their adjacent ends, a pipe flange corresponding to each collar and mounted loosely on its corresponding pipe section, an orifice-meter plate between the collars and having an opening through it, connecting means for drawing the flanges together to clamp the meter plate between the collars, a shoulder ring corresponding to each pipe connection and welded to the same adjacent to its corresponding flange, and bolts carried on the flanges for moving them apart when the said connecting means have been removed, said rings operating to take the thrust of the flanges in the separating movement to effect the separation of the collars and permit the removal of the meter plate.

3. In an orifice-meter connection, the combination of two opposed pipe sections having integral collars respectively at their adjacent ends, a pipe flange on each pipe connection corresponding to each collar and mounted loosely on its corresponding pipe, a meter-plate disposed between the collars and having an opening through it, clamping bolts connecting the flanges to clamp the meter plate between the collars, a shoulder ring corresponding to each pipe and welded to the same adjacent to its corresponding flange, and set-screws mounted in one of the flanges and abutting against the opposite flange for separating the flanges when the clamping bolts have been removed, said rings operating to take the thrust of the flanges in the separating movement and effect a separation of the collars to permit the removal of the meter-plate.

Signed at Los Angeles, California, this 17th day of April, 1926.

HARRY M. HALDEMAN.